March 6, 1951 J. G. LINDEMAN 2,543,786
TWO-WAY PLOW ATTACHMENT FOR TRACTORS
Filed July 16, 1945 4 Sheets-Sheet 1

INVENTOR.
JESSE G. LINDEMAN
BY
ATTORNEY

March 6, 1951  J. G. LINDEMAN  2,543,786
TWO-WAY PLOW ATTACHMENT FOR TRACTORS
Filed July 16, 1945  4 Sheets-Sheet 2

INVENTOR.
JESSE G. LINDEMAN
BY *Jesse P. Whann*
ATTORNEY

March 6, 1951 J. G. LINDEMAN 2,543,786
TWO-WAY PLOW ATTACHMENT FOR TRACTORS
Filed July 16, 1945 4 Sheets-Sheet 4

INVENTOR.
JESSE G. LINDEMAN
BY
Jesse P. Wharton
ATTORNEY

Patented Mar. 6, 1951

2,543,786

UNITED STATES PATENT OFFICE 2,543,786

TWO-WAY PLOW ATTACHMENT FOR TRACTORS

Jesse G. Lindeman, Yakima, Wash., assignor, by mesne assignments, to Deere & Company, Moline, Ill., a corporation of Illinois Application July 16, 1945, Serial No. 605,256

28 Claims. (Cl. 97—26)

My invention relates to a simple two way plow attachment for tractors.

It is an object of the invention to provide a two way plow which may be quickly attached to and detached from the tractor with which it is used. The present two way plow attachment is connected to the tractor by three pins or bolts and includes, without the need for making additional connections to the tractor, means for automatically rotating the plow member when it is lifted from operative position by power means carried by the tractor.

My present invention may be employed with any tractor having projecting tool arms to which it is customary to attach earth working tools, and a power device for raising and lowering these arms. A tractor to which my present invention is especially adapted is the Ford-Ferguson tractor having a pair of rearwardly extending tool arms and a hydraulic mechanism for raising and lowering these arms. The present two way plow attachment has means for attaching it to the connections provided by or at the outer ends of the tool arms, and for attaching it to a third connection which is carried back of the driver's seat on the tractor.

It is an object of the invention to provide a tool attachment for tractors of this type having a tool member with a plurality of tools which are brought into ground engaging position by rotation of the tool member, and means supported and operating independently of the tractor for rotating the tool member and locking it in its different positions.

A further object of the invention is to provide a device of this character wherein the supporting structure for the tool comprises several articulated parts, and wherein the tool rotating means is actuated by or as the result of relative movement of articulated parts of the supporting structure when the tool is lifted from ground engaging position.

A further object of the invention is to provide a tool device of this character having a frame member which is connected to the outer ends of the tool arms of the tractor and a link which connects the upper part of the frame member to the third connection on the back of the tractor, and an abutment member carried by the link so as to engage crank means connected to the tool member when the device is lifted, the engagement of the crank means with the abutment producing rotation of the crank means, which rotation is transmitted to the tool member.

A further object of the invention is to provide a device of the character referred to in the preceding paragraph having means for maintaining the cooperative relation between the crank means and the abutment member which is connected to the link so that it may have compensating or adjusting movement.

A further object of the invention is to provide this device with a lock for maintaining the tool member in its different positions of operation, with means for automatically releasing the lock when the tool member is lifted, so that rotation of the tool member may be accomplished.

A further object of the invention is to provide a two way plow having a coulter wheel and means for changing the position of the coulter wheel when the plow member is rotated from one of its positions to the other.

Further objects and advantages of the invention may be brought out in the following part of the specification.

Referring to the drawings which are for illustrative purposes only,

Fig. 3 is a sectional view taken as indicated by the line 3—3 of Fig. 1.

Fig. 3a is a fragmentary view showing the crank means swung into its opposite position.

Fig. 4 is an enlarged fragmentary section taken as indicated by the line 4—4 of Fig. 3.

Fig. 5 is a sectional view taken as indicated by the line 5—5 of Fig. 4.

Fig 6 is a sectional view taken as indicated by the line 6—6 of Fig. 4.

Fig. 7 is an enlarged fragmentary sectional view taken as indicated by the line 7—7 of Fig. 1.

Figure 1:
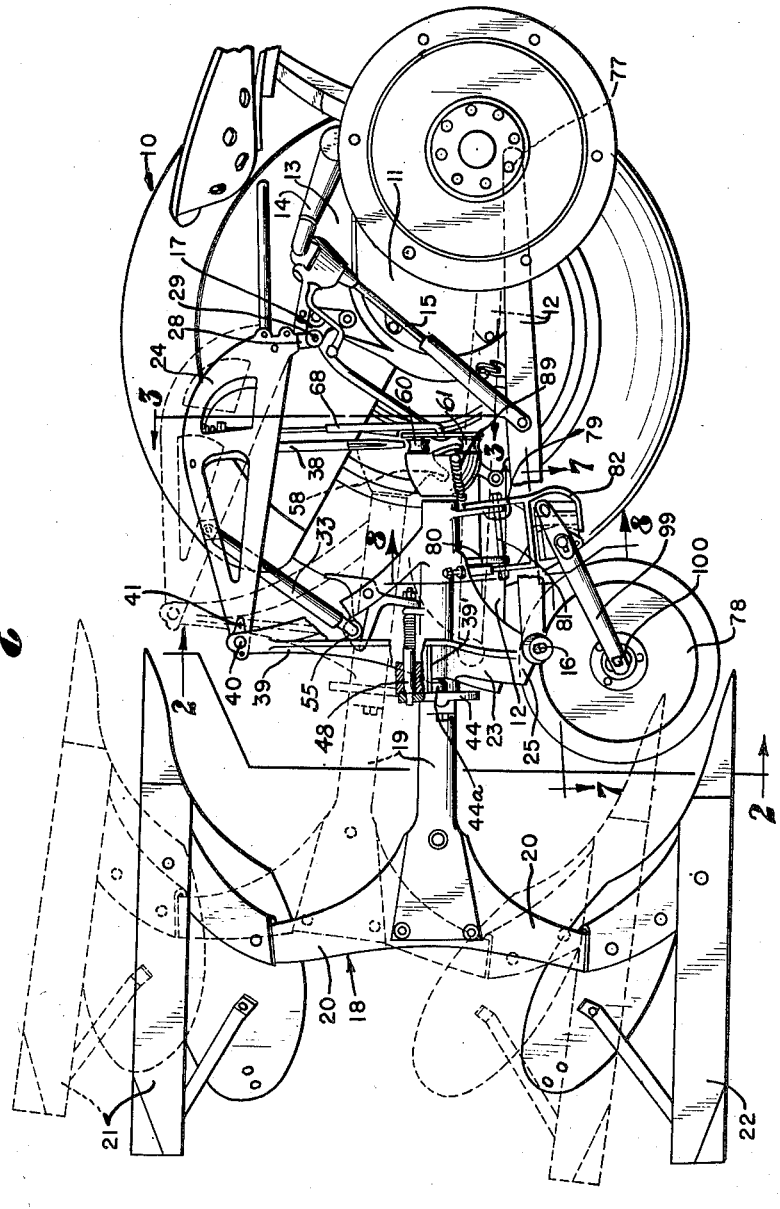
Fig. 1 is a perspective side view of a preferred embodiment of the invention connected to a tractor from which one wheel has been removed.

In Fig. 1 I show a portion of the rear end of a general utility farm tractor 10, the near back wheel of the tractor having been removed so as to disclose the transmission case 11 and associated parts at the rear end of the tractor. This tractor has, as a part of its standard equipment, a pair of rearwardly extending tool arms 12, a hydraulic device 13 which has operating levers 14 extending therefrom, and links 15 for connecting the levers 14 to the tool bars 12 so that by operation of the hydraulic device 13, so as to rotate the levers 14 upwardly, the tool bars 12 will be swung upwardly from the working positions in which they are shown in Fig. 1. These tool bars 12 are further shown in Fig. 2. They have at their outer ends connections 16 for use in the attachment of tools to the tractor. The tractor 10 has also a third connection which includes a bell crank 17 positioned on the upper portion of the transmission housing 11.

My present invention includes a two way plow member 18 which comprises a central shaft element 19 having projecting arms 20 to which the earth turning tools or plows 21 and 22 are attached, one of these plows being right hand and the other left hand, so that one will turn the furrow to the right and the other to the left. In the use of the tractor plow shown in Fig. 1, the operator employs one of the plows when traveling one direction, and when he turns the tractor around so as to travel in the opposite direction, the remaining plow is rotated down into earth working position, thereby turning each furrow back upon the furrow previously made.

Figure 2:
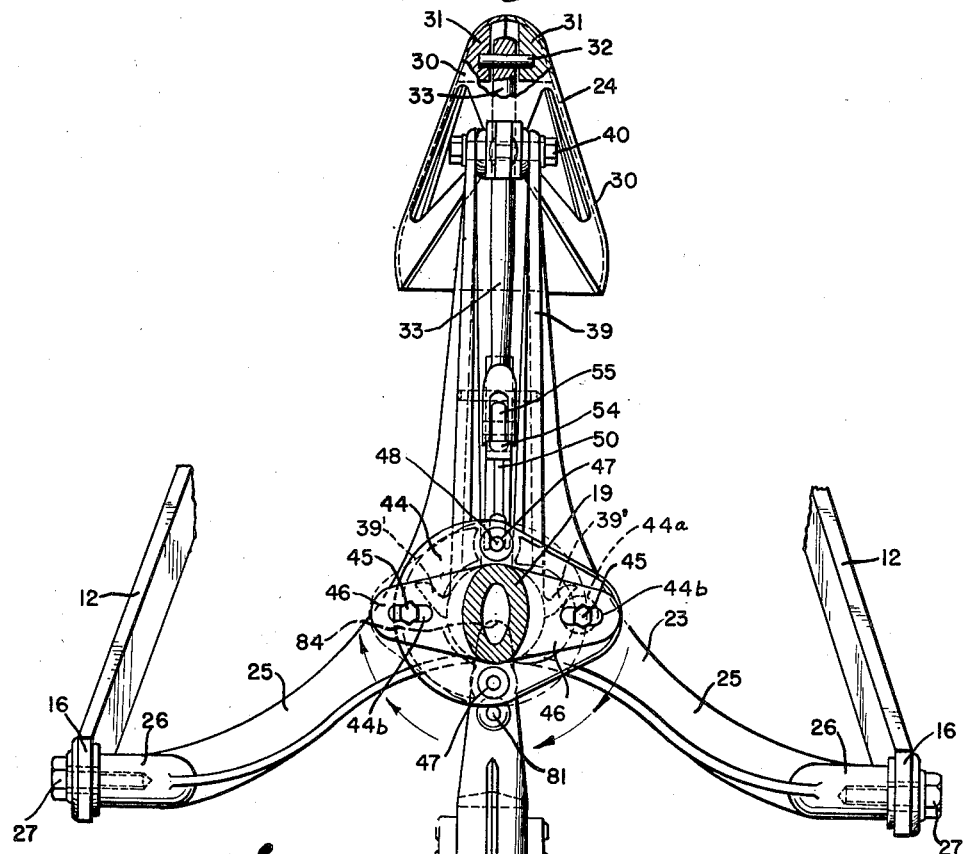
Fig. 2 is an enlarged sectional view taken as indicated by the line 2—2 of Fig. 1.

The two way plow attachment has only two parts which are connected to the tractor, namely—a frame 23 and a link member 24. As shown in Figs. 1 and 2, the frame 23 has laterally extending arms 25 for attachment to the connections 16 at the outer ends of the tool bars 12 of the tractor. As shown in Fig. 2, the arms 25 have at the outer ends thereof bosses 26 adapted to receive screws 27 which pass through openings in the connections 16. As shown in Fig. 1, the forward end of the link member 24 has a projecting part 28 through which a pin 29 may be passed to connect it to the third connection of the tractor, or, specifically, to the bell crank 17 which is connected to the tractor 10 in a manner having to do with the control of the hydraulic device 13, but which requires no description here for the reason that the function and utility of these parts are well known to the art.

The link member 24 is of a characteristic design and construction. It consists of a pair of symmetrical castings 30, the walls of which are curved in a manner to obtain ample strength from the weight of metal employed, and yet provide for the connection of the link member 24 with other parts.

As shown in Fig. 2, the members are provided with cooperating bosses 31 having openings to receive a pin 32 which supports the upper end of a lock releasing rod 33. Between the bosses 31 and the front end of the link member 24, the castings 30 have bosses 34 as shown in Figs. 3, 4, and 5, these bosses 34 being provided with openings 35 to receive trunnions 36 which project from a swivel block 37 by which a thrust member or abutment member 38 is connected to the link member 24.

The frame 23 has a pair of upwardly extending walls 39 which are spaced on opposite sides of the median vertical plane, the upper ends of these walls carrying a bolt 40 adapted to be extended through one of several spaced openings 41 in the rear or leftward end of the link member 24, providing in conjunction with the attachment means 16 at the ends of the arms 12 a three point suspension for the frame 23.

Figure 10:
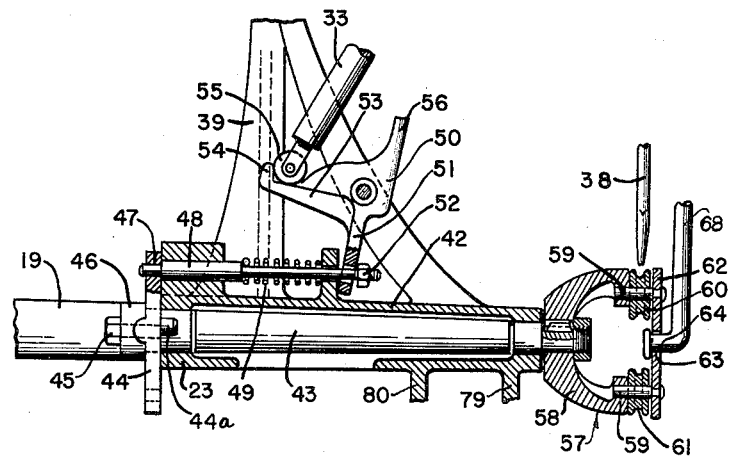
Fig. 10 is a fragmentary sectional view showing details of shaft supporting part of the frame.

As shown in Fig. 10, the frame 23 has, at the point of juncture of the arms 25 and the upwardly extending walls or posts 39 a tubular wall 42 through which the spindle portion 43 of the shaft element 19 extends, the shaft element 19 being thereby supported for rotation so as to accomplish rotation of the plow member 18 through an angle of 180° for the purpose of bringing either of the plows 21 or 22 into ground engaging position. Adjacent the outer end of the tubular wall 42, the shaft member 19 carries a locking and adjusting plate 44 which is shown in Figs. 1, 2, and 10, this locking plate 44 having a lug 44a projecting therefrom so as to engage sloping walls or stops 39' positioned on the frame 23 as shown in Figs. 1 and 2, and having slots 44b so that it may be connected to the shaft element 19 by bolts 45 which pass through ears 46 extended laterally from the shaft element 19. The locking plate 44 has therein openings 47 which are adapted to be engaged by a locking pin 48 which is carried on the upper portion of the tubular wall 42 as shown in Fig. 10. This locking pin 48 is urged toward operative position by a spring 49, and means for retracting the locking pin are provided in the form of a lever 50 having a downwardly projecting portion 51 positioned so as to engage a nut 52 on the end of the locking pin 48. The lever member 50 has a rearwardly extending leg 53 provided with an upwardly projecting toe or lug 54 adapted to be engaged by a roller 55 carried at the lower end of the lock releasing rod 33 which is pivotally connected to the link member 24 as shown in Fig. 2. Whenever the plow attachment is swung upward from the position in which it is shown in full lines in Fig. 1 through the position shown by dotted lines, the change in angular relation between the link 24 and the frame 23 will cause the roller 55 to bear relatively downwardly against the lever member 50, rotating the same in counterclockwise direction so that the downwardly projecting portion 51 thereof will move rightward, Fig. 10, and retract the locking pin 48 from engagement with an opening 47 of the locking plate 44. The lever member 50 is provided with an upwardly projecting lug 56 which will engage the rod 33 at the end of the counterclockwise rotation of the lever member 50, to lift the roller 55 out of engagement with the lug 54, permitting the spring 49 to act against the locking pin 48 without restraint, whereupon the locking pin may enter an opening 47 in the locking plate 44 when rotation of the plow member 18 into a new position has brought an opening 47 into alignment with the pin 48.

To cooperate in the automatic rotation of the plow member when the device is lifted, the invention provides, on the forward end of the shaft element 19, a crank means 57 which includes, as shown in Figs. 1, 3, and 10, a crank body 58 which is keyed on the forward extremity of the shaft element 19, this crank body 58 having projecting pins 59 carrying rollers 60 and 61 which are grooved in the manner shown in Fig. 10. The outer ends of the pins 59 support a plate 62 which lies against the outer faces of the rollers 60 and 61, this plate 62 being in eccentric relation to the axis of the shaft member 19 and having therein an eccentric opening 63 which is engaged by the laterally projecting end 64 of a guide bar section 65 having an opening 66 extending downwardly therein from its upper end to receive the lower end of a rod 67 which constitutes an upper guide bar section in telescoping relation to the lower guide bar section 65. This telescoping guide bar 68 which consists of the sections 65 and 67 lies adjacent to the front face of the thrust or abutment member 38 as shown in Figs. 1 and 3.

As shown in Figs. 3, 4, 6, and 7, the upper part of the member 38 has a forwardly projecting wall 69 provided with an opening 70 through which the upper end of the rod 67 extends, the rod 67 having thereon a collar 71 to engage the lower face of the wall 69. As best shown in Figs. 5 and 6, a compression spring 72 is placed around the portion of the rod 67 projecting above the wall 69, and a nut 73 is threaded onto the upper end of the rod 67. The compression spring 72 acts upwardly against the nut 73 and thereby exerts a constant lifting action on the rod 67 so as to hold the collar 71 against the lower face of the wall 69. The spring 72, therefore, yieldably urges the upper face of the collar 71 into engagement with the lower face of the wall 69, the result being that the rod 67 tends to maintain a position perpendicular to the lower face of the wall 69, or substantially parallel to the member 38. The telescoping guide rod 68, accordingly, tends to maintain the abutment member 38 in alignment with the opening 63 in the plate 62, but the flexible connection between the upper end of the rod 67 and the wall 69 permits the abutment member 38 to be swung from this position of alignment when lateral force is applied thereto. The lower end of the abutment member 38, as shown in Fig. 3, has diverging fingers 74 defining a V-shaped notch 75 for cooperation with the rollers 60 and 61 during parts of the operation which will be later described. The rollers 60 and 61 are so positioned with relation to the plow member 18 that when the plow member is in one of its vertical or ground engaging positions, the rollers 60 and 61 will lie in a vertical plane $a—a$, Fig. 3, laterally offset from the axis of rotation of the plow member represented by the axis of the shaft element 19. When the operation of the device rotates the plow member 18 into its opposite position of use, the crank member 58, Fig. 3, rotates in the direction indicated by the arrow 76, through an angle of 180° to bring the crank body 58 into the position in which it is shown in Fig. 3a, wherein the rollers 60 and 61 will lie in a substantially vertical plane $b—b$ on the opposite side of the axis of rotation defined by the shaft element 19, the roller 61 now being above the roller 60. The plate 62 likewise rotates through an angle of 180° and carries the lower end of the extensible guide rod 68 into the position likewise on the opposite side of the axis of rotation, thereby swinging the lower end of the abutment member 38 into a position above the roller 61.

Figure 11:
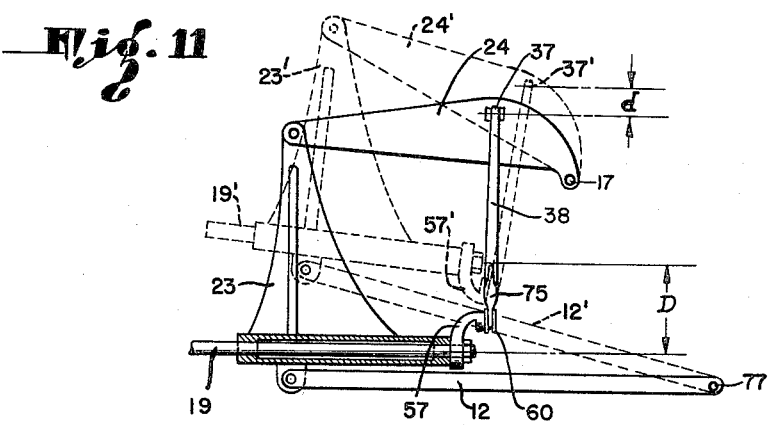
Fig. 11 is a diagrammatic view to show the relative movement of parts of the device utilized in rotating the plow member.

The automatic action of rotating the plow member 18 when the device is raised is schematically represented in Fig. 11, wherein the frame 23, tool arms 12 of the tractor, link member 24, crank means 57 on the forward end of the shaft element 19, and the thrust member or abutment member 38 are shown diagrammatically in full lines in the respective positions assumed thereby when the plow device is in lowered position. When the arms 12 are swung upward around the pivot means 77 at their forward ends to raised positions such as indicated by dotted lines 12', the frame will be lifted to its position indicated by dotted lines 23' and the link member 24 swung into the raised position thereof indicated by dotted lines 24'. Owing to the fact that the swivel connection 37 at the upper end of the abutment member 38 is relatively close to the pivot 17 around which the link member 24 swings upward, the upward displacement of the swivel means 37 from its lowered position to its raised position 37' will be through only the relatively small distance $d$; whereas, the forward end of the shaft member 19 will be swung upward through the much greater distance $D$. Accordingly, when the parts of the device are swung upward from the full line positions thereof, Fig. 11, toward the dotted line positions thereof, the forward end of the shaft member 19 will travel at a greater rate of speed than does the abutment member 38, the result being that the crank means 57 engages the forked lower end of the abutment member 38, and since the shaft element 19 on which the crank means 57 is fixed must move upwardly relatively to the abutment member 38, a relatively downward rotation of the crank means is produced, so that when the crank means has been carried into its raised position as indicated by dotted lines 57', it will extend downwardly from the forward end of the raised shaft element indicated at 19'. To avoid confusion, only one of the rollers—for example, the roller 60—of the crank means 57 has been shown in Fig. 11. The reaction of the crank means 57 against the abutment member 38 does not in itself produce complete rotation of the plow member 18, but the relative movement of the crank means 57 and the abutment member 38 produces operative engagement between these parts during rotation of the plow member through an angle much greater than 90°, carrying the plow member well beyond neutral position so that its weight, and also momentum, may act therein to complete the full rotation of 180° required to bring it into its consecutive position of operation. Therefore, as shown in Figs. 3 and 3a, the reaction of the crank means 57 against the abutment member 38 will produce rotation of the crank means 57 and the parts connected thereto, back and forth between the positions shown in these figures, the telescoping guide bar 68 functioning to correlate the position of the abutment member 38 with the rollers 60 and 61, respectively, of the crank means 57 when the crank means is in the positions thereof indicated in Figs. 3 and 3a. The locking pin 48 is automatically retracted in cooperative relation to the action of the abutment member 38 in producing rotation of the plow member 18, by the lock releasing rod 33 and the bell crank lever 50, described with relation to Fig. 10.

Figure 8:
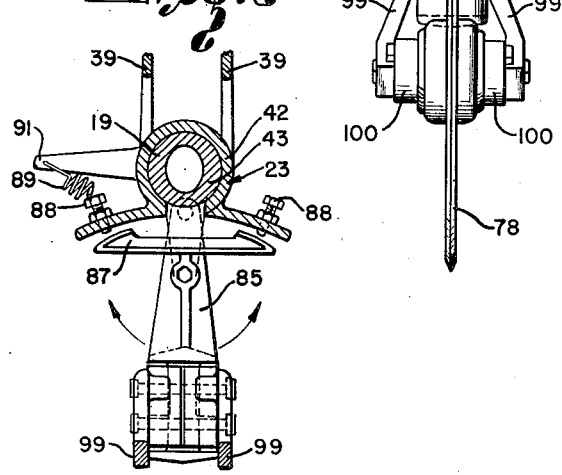
Fig. 8 is a fragmentary sectional view taken as indicated by the line 8—8 of Fig. 1.
Figure 9:
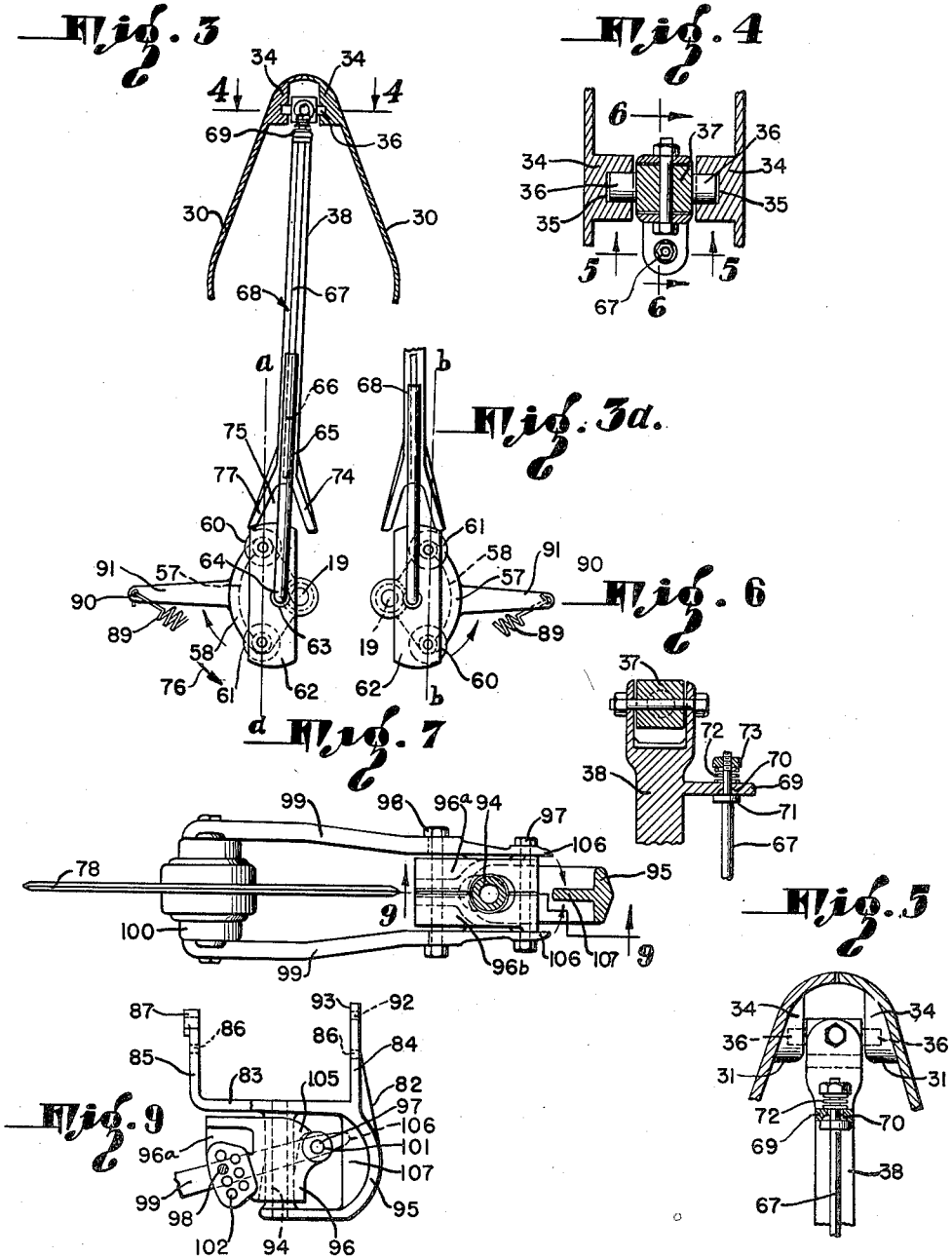
Fig. 9 is a fragmentary sectional view taken as indicated by the line 9—9 of Fig. 7.

The invention also includes an improved means for supporting and positioning a coulter wheel or disc 78. Parallel arms 79 and 80 are extended downwardly from the tubular portion 42 of the frame 23 to support a pin 81 which serves as hinge or pivot means for a swingable bracket 82 which is shown to enlarged scale and in section in Figs. 7, 8, and 9. As shown in Fig. 9, this bracket 82 has a horizontal web 83 with upwardly projecting arms 84 and 85 at the front and rear ends thereof, to overlap the arms 79 and 80 which project downward from the frame 23, there being openings 86 in these arms 84 and 85 through which the ends of the bolts 81 pass. On the other end of the arm 85 there is a cross bar 87 as best shown in Figs. 8 and 9, for cooperation with the lower ends of the testing screws 88 which are carried by the frame 23 in position for engagement with the ends of the arm 87 when the bracket is swung from one side to the other by a spring 89, one end of which is connected to an opening 90 in the outer end of an arm 91 which projects from the crank body 58 as shown to enlarged scale in Figs. 3 and 3a, the opposite end of the spring 89 being connected to an opening 92 in the upwardly projecting end 93 of the arm 84 of the bracket 82. When the crank body is swung back and forth between the positions thereof shown in Figs. 3 and 3a, the arm 91 will be carried into oppositely projecting positions, swinging the spring 89 therewith so that the tension of the spring will be exerted in opposite directions and rotate the bracket through a limited angle, determined by the setting of the adjustment screws 88, thereby shifting the coulter 78 from side to side, in keeping with the swinging of the plow member 18 from one of its positions to the other.

The bracket 82, Fig. 9, has cast integrally therewith a vertical shaft or column 94 which projects downwardly from substantially the central portion of the web 83, there being a yoke 95 extending forwardly from the lower end of the vertical shaft 94 and curving upward to merge with the forward end of the web 83 of the bracket 82. A tool part block 96 is swingable on the shaft or post 94, this block 96 having symmetrical halves 96a and 96b which are held together by bolts 97 and 98, these bolts 97 and 98 passing also through openings provided therefor in the forward ends of symmetrical arms 99, the rearward ends of which support a coulter bearing 100. As best shown in Fig. 9, the block 96 has a single opening 101 therethrough for passage of the bolt 97 and a plurality of openings 102 through which the bolt 98 may be passed, making it possible to adjust the arms 99 and thereby raise and lower the coulter 78. The block 96 has therethrough an opening 105 through which the shaft 94 extends, this opening 105 being formed so as to permit a limited rocking of the block relatively to a transverse axis. The block 96 may rotate around the axis of the vertical shaft 94 through an angle which is limited by the engagement of the extremities 106 of the arms 99 with the web 107 of the yoke 95.

An important feature of the invention is the adjustability of the angle of rotation of the shaft, whereby the plows may be brought into proper position for level ploughing. It will be noted that the stops 39', Fig. 2, are disposed on opposite sides of the axis of rotation of the member 19 and that they have downwardly and inwardly sloping faces for engagement by the lug 44a when the locking plate 44 swings through an angle of substantially 180° from one of its extreme positions to the other. The locking plate 44 is shiftable laterally along the transverse line defined by the slots 44b in the lugs or ears 46 which project in opposite directions from the shaft member 19. In Fig. 2 the locking plate 44 is shown in centralized position, that is to say—with both of its pin openings 47 lying in the vertical plane defined by the locking pin 48, the slots 44b at this time lying in a horizontal plane, or in other words in a plane perpendicular to the plane as defined by the openings 47. The operator may loosen the bolts 45 and shift the locking plate 44 laterally along the line defined by the slots 44b, thereby bringing both openings 47 of the locking plate 44 into an offset position so that they will not then lie in a plane which passes through the axis of rotation of the shaft member 19. Therefore, using the axis of rotation of the shaft member 19 as a center, the angular distance between the openings 47 will be changed from the value of 180° in which they are shown in Fig. 2 to another angle—for example, 170° or 185°—thereby changing the angle of rotation of the shaft member 19 necessary to alternately bring the openings 47 into alignment with the locking pin 48. In view of the fact that the locking plate 44 is shifted laterally upon the shaft member 19, this single adjustment of the locking plate 44 along the line defined by the slots 44b will adjust the angle and therefore the ploughing position of both of the plows 21 and 22.

I claim as my invention:

1. In a two way plow for use with a tractive vehicle having a pair of tool bars, a third connection and a power means for raising and lowering said tool bars, the combination of: a supporting structure having a detachable connection with said tool bars, a member pivotally connected with the upper portion of said supporting structure and said third connection, said member being adapted to be raised and lowered relatively to said supporting structure by the raising and lowering of said tool bars and supporting structure; a two way plow member supported by said supporting structure so that it may have rotation about a generally fore and aft extending axis so as to bring one or the other of its plows into lowered position; a crank on the forward end of said plow member and means including a vertically disposed member connected at its upper end with said first mentioned member and operatively connected at its lower end with said crank for rotating said plow member from one of its ground engaging positions to the other.

2. In a two way plow for use with a tractive vehicle having a pair of tool bars, a third connection, and power means for raising and lowering said tool bars, the combination of: a supporting structure having a three-point detachable connection with said tool bars and said third connection and adapted to be raised and lowered relatively to the ground by the raising and lowering of said toolbars; a two way plow member having a crank at its forward end and supported by said supporting structure so that it may have rotation about a generally fore and aft extending axis so as to bring one or the other of its plows into lowered position; a part movable relative to said supporting structure when the latter is raised and lowered; and means connected with said crank to rotate said plow member from one of its ground engaging positions to the other.

3. In a two way plow for use with a tractive vehicle having a pair of tool bars, a third connection, and power means for raising and lowering said tool bars, the combination of: a supporting structure having a three-point detachable connection with said tool bars and said third connection and adapted to be raised and lowered relatively to the ground by the raising and lowering of said tool bars; a two way plow member having a pair of generally oppositely arranged cranks at its forward end and supported by said supporting structure so that it may have rotation about a generally fore and aft extending axis so as to bring one or the other of its plows into lowered position; a part movable relative to said supporting structure when the latter is raised and lowered; and means for guiding said part into connection with one or the other of said cranks for causing said part, upon raising of said supporting structure, to rotate said plow member from one of its ground engaging positions to the other.

4. In a two way plow for use with a tractive vehicle, the combination of: a supporting structure adapted to be raised and lowered relatively to the ground; operating means for raising and lowering said supporting structure; a two way plow member supported by said supporting structure so that it may have rotation so as to bring one or the other of its plows into lowered position; a part movable relative to said supporting structure when the latter is raised and lowered; means operatively connected between said part and said plow member to rotate said plow member from one of its ground engaging positions to the other when said supporting structure is moved generally vertically relative to the tractive vehicle; a coulter swingably connected to said supporting structure; and means connected to be moved by movement of said plow member for swinging said coulter from side to side as said plow member is rotated from one of its positions to the other.

5. In a two way plow for use with a tractive vehicle having a pair of tool bars, a third connection, and power means for raising and lowering said tool bars, the combination of: a supporting structure having a three-point detachable connection with said tool bars and said third connection and adapted to be raised and lowered relatively to the ground by the raising and lowering of said tool bars; a two way plow member supported by said supporting structure so that it may have rotation so as to bring one or the other of its plows into lowered position; a part movable relative to said supporting structure when the latter is raised and lowered; means operatively connected between said part and said operating means to rotate said plow member from one of its ground engaging positions to the other; a coulter swingably connected to said supporting structure; and means connected with said plow member and said coulter for swinging said coulter from side to side as said plow member is rotated from one of its positions to the other.

6. In a two way plow for use with a tractive vehicle, the combination of: a supporting structure adapted to be raised and lowered relatively to the ground; operating means for raising and lowering said supporting structure; a two way plow member supported by said supporting structure so that it may have rotation so as to bring one or the other of its plows into lowered position; eccentric crank means connected to said plow member and adapted to be raised and lowered as said plow member is raised and lowered; an abutment in the path of movement of said crank means when it is moved upward, so as to be engaged by said crank means and produce rotation of said plow member from one of its ground engaging positions to the other; and means connected with said abutment for maintaining the latter in a position adjacent said crank means so as to operate the latter and rotate said plow member when the latter is raised from either of its positions.

7. In a two way plow for use with a tractive vehicle having a pair of tool bars, a third connection, and power means for raising and lowering said tool bars, the combination of: a supporting structure having a three-point detachable connection with said tool bars and said third connection and adapted to be raised and lowered relatively to the ground by the raising and lowering of said tool bars; a two way plow member supported by said supporting structure so that it may have rotation so as to bring one or the other of its plows into lowered position; eccentric crank means connected to said plow member and adapted to be raised and lowered as said plow member is raised and lowered; and an abutment carried by said supporting structure in the path of movement of said crank means when it is moved upward, so as to be engaged by said crank means and produce rotation of said plow member from one of its ground engaging positions to the other.

8. In a two way plow for use with a tractive vehicle, the combination of: a supporting structure adapted to be raised and lowered relatively to the ground; operating means for raising and lowering said supporting structure; a two way plow member supported by said supporting structure so that it may have rotation so as to bring one or the other of its plows into lowered position; eccentric crank means connected to said plow member and adapted to be raised and lowered as said plow member is raised and lowered; a laterally movable abutment member adapted to be disposed in the path of movement of said crank means when it is moved upward, so as to be engaged by said crank means and produce rotation of said plow member from one of its ground engaging positions to the other; and means operating to laterally move said abutment member so as to preserve its cooperative relation to said crank means.

9. In a two way plow for use with a tractive vehicle having a pair of tool bars, a third connection, and power means for raising and lowering said tool bars, the combination of: a supporting structure having a three-point detachable connection with said tool bars and said third connection and adapted to be raised and lowered relatively to the ground by the raising and lowering of said tool bars; a two way plow member supported by said supporting structure so that it may have rotation so as to bring one or the other of its plows into lowered position; eccentric crank means connected to said plow member and adapted to be raised and lowered as said plow member is raised and lowered; a laterally movable abutment member adapted to be disposed in the path of movement of said crank means when it is moved upward, so as to be engaged by said crank means and produce rotation of said plow member from one of its ground engaging positions to the other; and means operating to laterally move said abutment member so as to preserve its cooperative relation to said crank means.

10. In a ground working device for a tractive vehicle having a pair of tool bars, a third connection, and means for raising and lowering said tool bars, the combination of: a frame member having at the sides thereof means for connecting it to said tool bars and pivot means vertically spaced from said connecting means; a link connecting said pivot means to said third connection of said tractive vehicle; a ground working tool member rotatably supported by said frame, said tool member having a plurality of tool elements brought one at a time into ground working position by rotation of said tool member; crank means connected to said tool member so as to move up and down as said frame is raised and lowered; and abutment means carried by said link in the path of movement of said crank means whereby engagement of said abutment by said crank means will cause rotation of said tool member from one of its positions to another.

11. In a ground working device for a tractive vehicle having a pair of tool bars, a third connection, and means for raising and lowering said tool bars, the combination of: a frame member having at the sides thereof means for connecting it to said tool bars and pivot means vertically spaced from said connecting means; a link connecting said pivot means to said third connection of said tractive vehicle; a ground working tool member rotatably supported by said frame, said tool member having a plurality of tool elements brought one at a time into ground working position by rotation of said tool member; crank means connected to said tool member so as to move up and down as said frame is raised and lowered; abutment means carried by said link in the path of movement of said crank means whereby engagement of said abutment by said crank means will cause rotation of said tool member from one of its positions to another; lock means for locking said tool member in its different positions of operation; and means operating in consequence of the upward movement of said frame to release said lock means during the rotation of said tool member by said crank means.

12. In a ground working device for a tractive vehicle having a pair of tool bars, a third connection, and means for raising and lowering said tool bars, the combination of: a frame member having at the sides thereof means for connecting it to said tool bars and pivot means vertically spaced from said connecting means; a link connecting said pivot means to said third connection of said tractive vehicle; a ground working tool member rotatably supported by said frame, said tool member having a plurality of tool elements brought one at a time into ground working position by rotation of said tool member; crank means connected to said tool member so as to move up and down as said frame is raised and lowered; an abutment member having its upper end pivotally connected to said link so that its lower end part may be disposed in the path of movement of said crank means whereby engagement of said abutment by said crank means will cause rotation of said tool member from one of its positions to another; and means connected to said tool member and operating in response to rotation of said tool member to move said abutment member in cooperative relation to said crank means.

13. In a ground working device for a tractive vehicle having a pair of tool bars, a third connection, and means for raising and lowering said tool bars, the combination of: a frame member having at the sides thereof means for connecting it to said tool bars and pivot means vertically spaced from said connecting means; a link connecting said pivot means to said third connection of said tractive vehicle; a ground working tool member rotatably supported by said frame, said tool member having a plurality of tool elements brought one at a time into ground working position by rotation of said tool member about an axis, said tool member also having a part eccentric with respect to said axis; crank means connected to said tool member so as to move up and down as said frame is raised and lowered; an abutment member having its upper end pivotally connected to said link so that its lower end part may be disposed in the path of movement of said crank means whereby engagement of said abutment by said crank means will cause rotation of said tool member from one of its positions to another; and a rod member having its lower end connected to said eccentric part of said tool member and its upper end connected to said abutment member operating in response to rotation of said tool member to move said abutment member in cooperative relative to said crank means.

14. In a ground working device for a tractive vehicle having a pair of tool bars, a third connection, and means for raising and lowering said tool bars, the combination of: a frame member having at the sides thereof means for connecting it to said tool bars and pivot means vertically spaced from said connecting means; a link connecting said pivot means to said third connection of said tractive vehicle; a ground working tool member rotatably supported by said frame, said tool member having a plurality of tool elements brought one at a time into ground working position by rotation of said tool member; operating means actuated by relative movement of said frame and said link means when the frame is moved by the vertical movement of said tool bars, for rotating said tool member; a latch plate on said tool member; a pin carried by said frame for cooperation with said latch plate; spring means urging said pin toward said latch plate; a lever member pivoted on said frame, rotatable to move said pin out of engagement with said latch plate; and a thrust rod having its upper end pivotally connected to said link and its lower end engaging said lever, for rotating said lever when said frame is moved in one of its vertical directions by said tool bars.

15. In a ground working device for a tractive vehicle, the combination of: a frame member for connection to the vehicle so that it may be raised and lowered; means to raise and lower said frame member; a plow element rotatably carried by said frame member, said plow element comprising a right hand plow and a left hand plow; means for rotating said plow element relatively to said frame member so as to bring one and then the other of said plows into ground engaging position; and locking means for determining the extremes of the angle of rotation of said plow element relatively to said frame member, said locking means having cooperating locking parts, one of which is carried by said frame member and the other of which is carried by said plow element, one of said locking parts comprising a plate member having two spaced apart sections and the other of said locking parts comprising a member adapted to have locking connection with one or the other of said sections, said plate being adjustable relatively to said plow element.

16. In a ground working device for a tractive vehicle, the combination of: a frame member for connection to the vehicle so that it may be raised and lowered; means to raise and lower said frame member; a plow element rotatably carried by said frame member, said plow element comprising a right hand plow and a left hand plow; means for rotating said plow element relatively to said frame member so as to bring one and then the other of said plows into ground engaging position; and locking means for determining the extremes of the angle of rotation of said plow element relatively to said frame member, said locking means comprising a locking pin carried by said frame member and a locking plate laterally adjustable on said plow element, said plate having diametrally opposed recesses for engagement by said locking pin.

17. In a two-way plow for use with a tractive vehicle, the combination of: a supporting structure; a two-way plow member supported by said supporting structure so that it may have rotation so as to bring one or the other of its plows into lowered position; a coulter disposed generally below said supporting structure and mounted thereon for lateral movement, including a bracket connected for lateral swinging to said supporting structure, an arm connected for general vertical adjustment relative to said bracket, and a coulter blade carried by said arm; an operating arm on said rotatable plow member; and means connected between said arm and said bracket for shifting said coulter blade relative to said supporting structure when said plow member is shifted from one position to another.

18. In a two-way plow, a supporting structure, a plow member rockably mounted on said supporting structure from one position to another, an arm carried by said plow member, a laterally shiftable coulter carried by said supporting structure and shiftable from one position to another in accordance with the movement of said plow member from one position to another, a spring connection between said arm and said coulter for shifting the latter by movement of said arm, and laterally spaced stop means adjustably mounted on said structure for determining the lateral positions of said coulter.

19. A two-way plow comprising a mobile support, a plow unit comprising a rotatable beam and a pair of plow bodies fixed thereto, means for raising and lowering said beam to carry both of said plow bottoms into a raised position, a generally horizontally disposed link member pivotally connected with said plow unit and said mobile support and shiftable generally vertically relative to said plow unit when the latter is raised, latch means for holding said plow beam in either of two operative positions including a locking plate fixed to said beam to rotate with the latter and having spaced apertures therein and a plunger carried by said unit and adapted to enter either of said apertures, and means connected with said link member and said plunger for operating the latter.

20. A two-way plow as set forth in claim 19, further characterized by said locking plate being adjustable laterally relative to said beam whereby to vary the extent of rotation of the latter.

21. In a two-way plow adapted to be mounted on a mobile support, a plow beam supporting structure, a plow beam rotatably carried thereby and having oppositely mounted plow bodies, means for raising and lowering said support structure and including means for rotating said plow beam, an arm fixed to the latter and swingable from side to side when the plow beam is rotated, means for rotating said plow beam to reverse said plow bodies, a laterally shiftable coulter mounted on said supporting strcture, and means operatively connected with said swingable arm and said coulter for shifting the latter when said plow beam is reversed.

22. A two-way plow adapted to be mounted on a tractor by generally vertically swingable links, said tractor having means connected with certain of said links for raising said links, said two-way plow comprising a supporting structure, a fore and aft extending plow beam rockable thereon and carrying oppositely mounted plow bodies, a crank member fixed to the forward end of said rockable plow beam, and an operating member shiftable generally vertically and connected at its upper end with one of said links and having a crank-engaging portion at its lower end adapted to engage said crank and rotate said plow beam when the latter is raised.

23. A two-way plow adapted to be mounted on a tractor by generally vertically swingable links, said tractor having means connected with certain of said links for raising said links, said two-way plow comprising a supporting structure, a fore and aft extending plow beam rockable thereon and carrying oppositely mounted plow bodies, a crank member fixed to the forward end of said rockable plow beam, an operating member shiftable generally vertically and connected at its upper end with one of said links and having a crank-engaging fork at its lower end adapted to engage said crank and rotate said plow beam when the latter is raised, and means acting between said operating member and said plow beam for guiding said fork portion toward and away from said crank portion.

24. The invention set forth in claim 23, further characterized by said guiding means comprising an extensible rod member connected with said crank member to be shifted with the latter and spring connected with said operating member.

25. A two-way plow adapted to be mounted on a tractor by generally vertically swingable links, said tractor having means connected with certain of said links for raising said links, said two-way plow comprising a supporting structure, a fore and aft extending plow beam rockable thereon about a generally fore and aft extending axis and carrying oppositely mounted plow bodies, a crank member fixed to the forward end of said rockable plow beam, an operating member shiftable generally vertically and connected at its upper end with one of said links and having a crank-engaging portion at its lower end adapted to engage said crank and rotate said plow beam when the latter is raised, stop means on said supporting structure, and a part laterally adjustable on said beam and engageable with said stop means for varying the permissive angular movement of said plow beam when shifted by action of said operating member against said crank member.

26. A two-way plow adapted to be mounted on a tractor by generally vertically swingable links, said tractor having means connected with certain of said links for raising said links, said two-way plow comprising a supporting structure, afore and aft extending plow beam rockable thereon about a generally fore and aft extending axis and carrying oppositely mounted plow bodies, a crank member fixed to the forward end of said rockable plow beam, an operating member shiftable generally vertically and connected at its upper end with one of said links and having a crank-engaging portion at its lower end adapted to engage said crank and rotate said plow beam when the latter is raised, a locking plunger on said supporting structure, and a part laterally adjustable on said beam and enageable with said plunger for locking the plow beam in either of two positions, said part being adjustable for varying the permissive angular movement of said plow beam between said positions when shifted by action of said operating member against said crank member.

27. A two-way plow adapted to be mounted on a tractor by generally vertically swingable links, said tractor having means connected with certain of said links for raising said links, said two-way plow comprising a supporting structure, a fore and aft extending plow beam rockable thereon and carrying oppositely mounted plow bodies, a crank member fixed to the forward end of said rockable plow beam, an operating member shiftable generally vertically and connected at its upper end with one of said links and having a crank-engaging portion at its lower end adapted to engage said crank and rotate said plow beam when the latter is raised, releasable locking means connected to act between said plow beam and said supporting structure for holding the plow beam in either of two positions, and a second operating member also connected with said one link for releasing said locking means by raising movement of said supporting structure relative to said one link.

28. The invention set forth in claim 27, further characterized by said second operating member being released from said locking means in response to a given extent of movement of said second operating member relative to said locking means.

JESSE G. LINDEMAN.

REFERENCES CITED

The following references are of record in the file of this patent:

UNITED STATES PATENTS

| Number | Name | Date |
|---|---|---|
| 1,021,117 | Van Egeren | Mar. 26, 1912 |
| 1,358,158 | Karn | Nov. 9, 1920 |
| 1,467,894 | Dubois | Sept. 11, 1923 |
| 1,560,639 | Andrews | Nov. 10, 1925 |
| 2,227,366 | Pridgen | Dec. 31, 1940 |

FOREIGN PATENTS

| Number | Country | Date |
|---|---|---|
| 36,803 | France | Apr. 29, 1930 |
| | (Addition to No. 629,302) | |
| 638,191 | France | Feb. 14, 1928 |
| 675,092 | France | Oct. 29, 1929 |
| 226,264 | Germany | Sept. 29, 1910 |
| 544,041 | Great Britain | Mar. 25, 1942 |
| 250,807 | Italy | Nov. 12, 1926 |
| 259,848 | Italy | Aug. 24, 1928 |
| 271,983 | Italy | Feb. 25, 1930 |